United States Patent
Naratil (10) Patent No.: US 7,925,566 B1
(45) Date of Patent: Apr. 12, 2011

(54) SYSTEM AND METHOD FOR TRADING FIXED INCOME FINANCIAL INSTRUMENTS

(75) Inventor: Thomas C. Naratil, Warren, NJ (US)

(73) Assignee: UBS Financial Services, Inc., Weehawken, NJ (US)

( * ) Notice: Subject to any disclaimer, the term of this patent is extended or adjusted under 35 U.S.C. 154(b) by 705 days.

(21) Appl. No.: 09/617,853

(22) Filed: Jul. 17, 2000

(51) Int. Cl.
*G06Q 40/00* (2006.01)

(52) U.S. Cl. ............................. 705/37; 705/36 R (58) Field of Classification Search .......... 705/1, 35–37; 707/100, 104.1
See application file for complete search history.

(56) References Cited

U.S. PATENT DOCUMENTS

| | | | | |
|---|---|---|---|---|
| 4,412,287 A | | 10/1983 | Braddock, III | 364/408 |
| 4,674,044 A | | 6/1987 | Kalmus et al. | 364/408 |
| 4,694,397 A | | 9/1987 | Grant et al. | 364/408 |
| 4,752,877 A | | 6/1988 | Roberts et al. | 364/408 |
| 4,823,265 A | | 4/1989 | Nelson | 364/408 |
| 4,933,842 A | | 6/1990 | Durbin et al. | 364/408 |
| 4,942,616 A | | 7/1990 | Linstroth et al. | 381/51 |
| 5,006,998 A | | 4/1991 | Yasunobu et al. | 364/513 |
| 5,077,665 A | | 12/1991 | Silverman et al. | 364/408 |
| 5,101,353 A | * | 3/1992 | Lupien et al. | 705/37 |
| 5,136,501 A | | 8/1992 | Silverman et al. | 364/408 |
| 5,231,571 A | | 7/1993 | D'Agostino | 364/408 |
| 5,297,032 A | * | 3/1994 | Trojan et al. | 705/37 |
| 5,339,392 A | * | 8/1994 | Risberg et al. | 345/762 |
| 5,375,055 A | | 12/1994 | Togher et al. | 364/408 |
| 5,394,324 A | | 2/1995 | Clearwater | 364/402 |
| 5,517,406 A | | 5/1996 | Harris et al. | 364/408 |
| 5,557,517 A | | 9/1996 | Daughterty, III | 364/408 |
| 5,715,402 A | | 2/1998 | Popolo | 395/237 |
| 5,724,524 A | | 3/1998 | Hunt et al. | 395/237 |
| 5,727,165 A | | 3/1998 | Ordish et al. | 395/237 |
| 5,758,328 A | | 5/1998 | Giovannoli | 705/26 |

(Continued)

FOREIGN PATENT DOCUMENTS

GB 2 389 687 A 12/2003

(Continued)

OTHER PUBLICATIONS

"Conceptual Trading Ideas—TYX—1999".*

(Continued)

*Primary Examiner* — Ella Colbert
*Assistant Examiner* — Daniel L Greene, Jr.
(74) *Attorney, Agent, or Firm* — Proskauer Rose LLP (57) ABSTRACT

A system for automated trading of U.S. Treasury, Liquid Agency, and Zero Coupon STRIP financial instruments comprises an updatable system database; an updatable offering inventory database which receives real time price and quantity information pertaining to each financial instrument from a market data feed; and a system proprietor operative to determine a national best bid and offer price and a derived price for each financial instrument in the offering inventory. The system proprietor applies a price improvement process to a trade in the event that an offsetting trade occurs, and updates the system database and offering inventory to reflect transactions executed by the system. Advantageously, the system provides users with a mechanism to provide the best price at the time of execution. Historical data is utilized to (i) price securities that are spread off a benchmark where an active quote for a particular security is unavailable, and (ii) retrieve prices for future analysis. The global fixed income market is thereby provided with a system that can sustain long term industry needs and readily adapt to a changing environment.

24 Claims, 3 Drawing Sheets

U.S. PATENT DOCUMENTS

| | | | |
|---|---|---|---|
| 5,794,219 A | 8/1998 | Brown | 705/37 |
| 5,802,497 A | 9/1998 | Manasse | 705/27 |
| 5,802,502 A | 9/1998 | Gell et al. | 705/37 |
| 5,809,483 A * | 9/1998 | Broka | 705/37 |
| 5,826,244 A | 10/1998 | Huberman | 705/37 |
| 5,832,462 A | 11/1998 | Midorikawa et al. | 705/35 |
| 5,842,178 A | 11/1998 | Giovannoli | 705/26 |
| 5,870,719 A | 2/1999 | Maritzen et al. | 705/26 |
| 5,884,274 A | 3/1999 | Walker et al. | 705/4 |
| 5,884,286 A | 3/1999 | Daughtery, III | 705/36 |
| 5,890,140 A | 3/1999 | Clark et al. | 705/35 |
| 5,893,079 A | 4/1999 | Cwenar | 705/36 |
| 5,905,974 A * | 5/1999 | Fraser et al. | 705/37 |
| 5,915,209 A * | 6/1999 | Lawrence | 340/3.7 |
| 5,987,432 A * | 11/1999 | Zusman et al. | 705/35 |
| 6,014,627 A * | 1/2000 | Togher et al. | 705/1 |
| 6,243,691 B1 | 6/2001 | Fisher et al. | 705/37 |
| 6,321,212 B1 * | 11/2001 | Lange | 705/37 |
| 6,377,940 B2 | 4/2002 | Tilfors et al. | 705/37 |
| 6,408,282 B1 * | 6/2002 | Buist | 705/37 |
| 6,505,174 B1 * | 1/2003 | Keiser et al. | 705/37 |
| 6,691,094 B1 * | 2/2004 | Herschkorn | 705/37 |
| 6,829,589 B1 | 12/2004 | Saliba | 705/36 R |
| 6,850,907 B2 | 2/2005 | Lutnick et al. | 705/37 |
| 7,249,075 B1 * | 7/2007 | Altomare et al. | 705/35 |
| 2001/0042033 A1 | 11/2001 | Sposito | 705/35 |
| 2001/0044767 A1 | 11/2001 | Madoff et al. | |
| 2001/0049651 A1 | 12/2001 | Selleck | 705/37 |
| 2002/0019794 A1 | 2/2002 | Katz et al. | |
| 2002/0169703 A1 | 11/2002 | Lutnick et al. | |
| 2002/0184136 A1 | 12/2002 | Cleary et al. | |
| 2004/0177026 A1 | 9/2004 | Balabon | |
| 2004/0199455 A1 | 10/2004 | Saliba | |
| 2004/0243505 A1 | 12/2004 | Sweeting et al. | |

FOREIGN PATENT DOCUMENTS

| | | | |
|---|---|---|---|
| WO | 01/02930 A2 | | 1/2001 |
| WO | 01/57752 A1 | | 8/2001 |
| WO | WO 02/07039 | * | 1/2002 |
| WO | 2004/008296 A2 | | 1/2004 |
| WO | 2004/042514 A2 | | 5/2004 |

OTHER PUBLICATIONS

CS Trading (1999) "Strips".*
Levitt, Arthur; "Speech by SEC Chairman: The Importance of Transparency in America's Debt Market"; U.S. Securities and Exchange Commisssion (SEC); Sep. 9, 1998; pp. 1-7.*
Nybo, P. Anders, Mah, Stephanie K., Needham, Charlotte L; "The 1998 Review of Electronic Transaction Systems in the U.S. Fixed Income Securities Markets"; Nov. 1998; The Bond Market Association; pp. 1-23.*
Soderlind, Paul and Svensson, Lars E.O.; "New Techniques to Extract Market Expections from Financial Instruments"; Department of Economics, Stockholm School of Economics, etc.; Nov. 1996; pp. 1-42.*
"Telerate Adds GovPX U.S. Treasury Prices and Information"; Business Wire; Feb. 8, 1999; pp. 1 and 2.*
A. Levitt, *The Importance of Transparency in America's Debt Market*, Speech at The Media Studies Center, NY, NY (Sep. 9, 1998).
Downes J., and Goodman J.E., Dictionary of Investment Terms, Fifth Edition, Barrons, 1998, p. 601, stop order definition.
http://invest-faq.com/cbc/trade-price-impr.html, "Subject: Trading—Price Improvement" in The Investment FAQ, last viewed and printed on Sep. 26, 2008 (3 pages total).
Notification of Transmittal of International Preliminary Examination Report, including International Preliminary Examination Report, date of mailing Apr. 20, 2007 (6 pages total).

* cited by examiner

SYSTEM AND METHOD FOR TRADING FIXED INCOME FINANCIAL INSTRUMENTS

BACKGROUND OF THE INVENTION

1. Field of the Invention

The present invention relates to a system for trading fixed income financial instruments; and more particularly to a computer-implemented system for automated trading of U.S. Treasury Securities, Liquid Agencies, and Zero-Coupon Strips.

2. Description of the Prior Art

New client demands, technological innovations and tighter regulatory controls are changing the shape of the money management industry. A new trend in asset management now provides clients with systems that allow execution of trades without the concomitant fees. The evolution of the Internet and the development of new technological capabilities are pressing security houses to develop methods that facilitate consumer needs for electronic trading.

Concerned with the lack of price transparency in the fixed income market, the SEC and other regulatory bodies have called on the National Association of Securities Dealers ("NASD") to: (1) adopt rules requiring dealers to report all transactions in U.S. corporate bonds to the NASD and to develop systems to receive and redistribute transaction prices on an immediate basis; and (2) create a system for transactions in corporate bonds that enables regulators to take a proactive role in supervising the corporate debt market rather than only reacting to complaints brought by investors. Arthur Levitt, Chairman of the U.S. Securities and Exchange Commission, Sep. 9, 1998, *The Importance of Transparency in America's Debt Market*, Speech at the Media Studies Center, New York, N.Y. As stated by Chairman Levitt, "[t]ransparency, disclosure and accountability . . . are the essential ingredients to confidence. And without [confidence] . . . markets can neither sustain long term growth nor adapt to a rapidly changing environment. Ibid.

The prior art has recognized the need to adopt computerized trading systems. U.S. Pat. No. 4,674,044 discloses a data processing apparatus that makes an automated trading market for one or more securities. This patent discloses a system comprising, among other components, a means for retrieving the best obtaining bid and ask prices from a remote data base which covers the ensemble of institutions or others making a market for the relevant securities. U.S. Pat. No. 5,893,079 discloses a system for receiving, processing, creating, storing and disseminating investment information which includes an external data interface for communicating with non user outside sources of investment data and processing and delivering such data to a central storage database for access by users.

While certain aspects of electronic trading have been automated, conventional computerized trading systems do not address the concerns expressed to the brokerage industry by regulatory bodies, and in particular, those regarding the fixed income market. Without these tools, the brokerage industry will be unable to sustain increased client demands, changing technological requirements and tighter regulatory controls imposed by the present marketplace.

Needed in the art are computerized systems for trading of high liquidity financial instruments that provide consumers with the best price at the time of execution and retrieve prices for future analysis. Also needed are systems which can utilize historical data to price securities in the event that active quotes are unavailable.

SUMMARY OF THE INVENTION

The present invention provides a system for automated trading of U.S. Treasury, Liquid Agency, and Zero Coupon STRIP financial instruments, comprising an updatable system database; an updatable offering inventory database which receives real time price and quantity information pertaining to each financial instrument from a market data feed; and a system proprietor capable of determining a national best bid and offer price and a derived price for each financial instrument in the offering inventory. The system proprietor applies a price improvement process to a trade in the event that an offsetting trade occurs, and updates the system database and offering inventory to reflect transactions executed by the system. Advantageously, the system provides users with a mechanism to provide the best price at the time of execution. In addition, the system of the invention utilizes historical data to price securities that are spread off a benchmark where an active quote for a particular security is unavailable, and retrieves prices for future analysis. In this way, present invention affords the global fixed income market a system that can sustain long term industry needs and readily adapt to a changing environment.

Also provided by the present invention is a data processing method for the automatic execution of high liquidity financial instruments which comprises storing information pertaining to customer and user position and offering inventory, the offering inventory including a real time market data feed; executing trade orders based on a national best bid and offer price or a derived price in the event the national best bid and offer price is not available; and applying a price improvement process to the national best bid and offer price or the derived price in the in the event that an offsetting trade occurs. In accordance with the method described herein, consumers are provided with an automated system for order entry, improvement and trade execution of fixed income financial instruments, and in particular U.S. Treasury Securities, Liquid Agencies and Zero Coupon STRIPS. Advantageously, the method described herein addresses stricter client demands, including the need to capitalize on technological innovations, and tighter regulatory controls required by the securities industry.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENTS

The present invention provides an automated system for order entry, price improvement and trade execution of fixed income financial instruments, and in particular, U.S. Treasuries, Liquid Agencies and Zero Coupon STRIPS (Separated Trading of Registered Interest and Principal of Securities). The system allows users to obtain current offerings and market quotations and execute orders thereon. Advantageously, the system applies a price improvement process to a submitted order to thereby provide the user with the benefit of an improved pricing scheme. Offering inventory, customer position and where applicable, user position, are automatically updated in accordance with trades executed by the system.

Generally stated, the present invention provides a computer implemented system for automated trading of fixed income financial instruments, and in particular, US Treasury, Liquid Agency and Zero Coupon STRIP instruments comprising an updatable system database; an updatable offering inventory database which receives a real time price and quantity available for execution for each financial instrument from a market data feed; and a system proprietor capable of determining a national best bid and offer price and a derived price for each financial instrument in the offering inventory, and providing such pricing information to the system database, the system proprietor being further operative to (i) apply a price improvement process to a trade in the event that an offsetting trade occurs, and (ii) update the system database and offering inventory database to reflect transactions executed by the system.

In accordance with the present invention, users are generally connected to the system database by conventional computerized workstations as that term is understood in the art. These computerized workstations enable user interaction with the system; for example, to formulate queries to review data, enter orders and receive confirmation of trade execution. The system database also provides connectivity to and from other system components.

An offering inventory database provides information pertaining to the inventory of all financial instruments available for trading by the system. The offering inventory includes a real time price and quantity available for execution for each financial instrument as provided by a real time market data feed from at least one interdealer broker or other proprietor of real time market data. The system proprietor converts the real time market data for each financial instrument in the offering inventory to a national best bid and offer price or a derived price for that a particular financial instrument in the event that the national best bid and offer price is not available and forwards this information to the system database for access by users. Based on this information, a user can enter market and day limit orders for automatic execution of U.S. Treasury, Liquid Agency and Zero Coupon STRIP financial instruments.

Advantageously, the system proprietor applies a price improvement process to each trade entered into the system if an offsetting trade occurs within 30 seconds after execution of the first trade. In this instance, the price improvement process will take the average of the two prices, calculate a new price, and apply this price to both trades. The system proprietor also automatically updates the listing of securities, quantity and price associated with each financial instrument in the offering inventory after a trade has been executed, modified or canceled. In addition, the system proprietor concomitantly updates customer position, or where applicable, user position and forwards this information to the system database for viewing by a user. After a trade has been executed and has been subjected to the price improvement process, or modified or canceled, the system immediately generates an electronic confirmation that is transmitted to the user. The system also allows for manual entry of trade orders as well as for manual updating of the offering inventory. This feature is particularly useful for interfirm or dealer to dealer trades.

The system of the present invention may be used by financial advisors trading on behalf of customers, traders, and customers seeking to trade securities. Of course, the system can be readily adapted to limit the capabilities of different users to conduct trades. By way of illustration, traders may be afforded the opportunity to cancel and/or modify executed orders, whereas other users may not have this same capability.

The system of the present invention utilizes a combination of advanced mid-range multiprocessor-based servers, such as the Ultra II from Sun Microsystems, utilizing standard operating systems, software written in C++, Java or a similar language, which is designed to drive the operation of the particular hardware and which is compatible with other system components, and I/O controllers for connection of the various system components.

The servers are connected via wide area networks (WAN), local area networks (LAN), or other private networks. The computerized workstations may be connected to the servers by any of the foregoing means as well as by the Internet. The workstations and servers utilize conventional token ring connectivity for WAN, LAN, or other private networks, or Ethernet, or other conventional communications standards. Where the workstations are connected to the system database server via the Internet, connectivity is provided by conventional TCP/IP sockets-based protocol. In this instance, the workstations utilize an Internet service provider outside of the system to establish connectivity to the system database server within the system.

Figure 1:
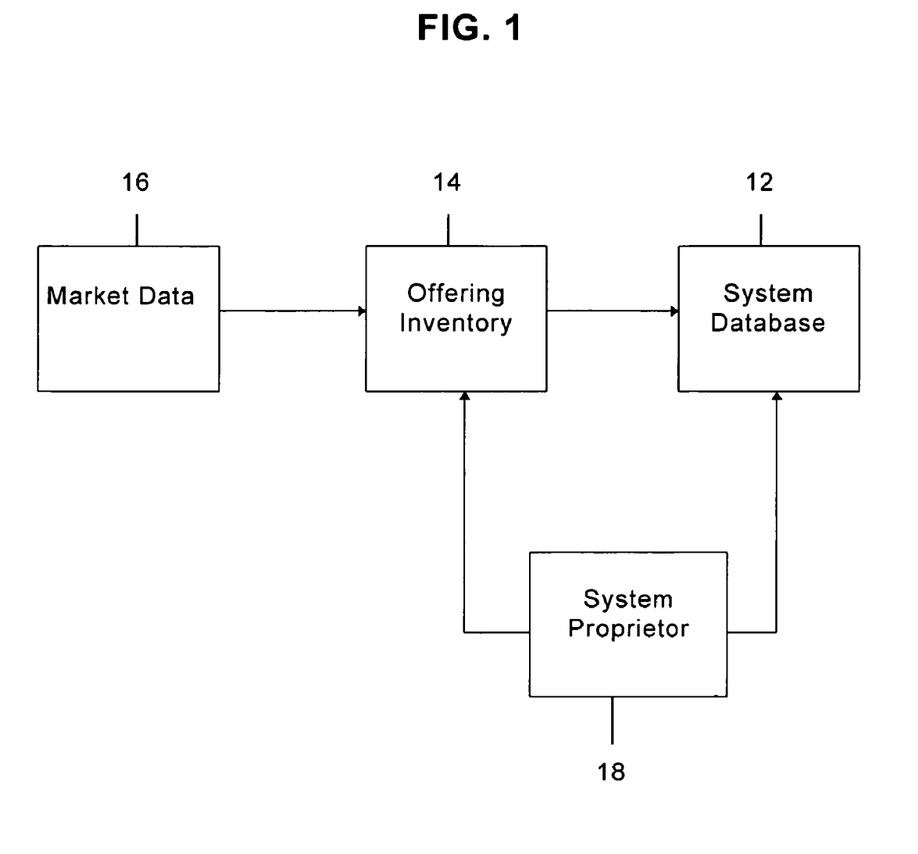
FIG. 1 is a schematic diagram illustrating the relationship between principal components of the system of this invention.

With the foregoing overview in mind, reference is made to FIG. 1, where there is shown a schematic diagram of the system of the present invention. The system comprises an updatable system database 12, an updatable offering inventory database 14, which receives a real time price and quantity available for execution for each financial instrument from a market data feed 16; and a system proprietor 18 capable of (i) determining a national best bid and offer price and a derived price for each financial instrument in the offering inventory, (ii) applying a price improvement process to a trade in the event that an offsetting trade occurs, and (iii) updating the system database with information pertaining to customer and user position.

As indicated, system database 12 provides information pertaining to customer position. In this instance, customer position relates to the customer's position at a brokerage forum. Thus, system database 12 provides the means for a user to determine whether execution of a particular order will create a short or long position for a customer. In addition, the system proprietor 18 automatically updates the system database 12 to provide a revised listing of securities, quantity and price associated with each financial instrument in the offering inventory after execution, cancellation or modification of a trade. Thus, system database 12 also provides means by which users can connect to the system and review the offering inventory.

Offering inventory database 14 provides a listing of all financial instruments available for trading by the system. Within the context of the present invention, financial instruments refer to all permutations of U.S. Treasury, Liquid Agency and Zero Coupon STRIP instruments; for example, 30 year Treasury notes, as well as 3 month and 6 month treasury bills. More specifically, the offering inventory database 14 contains real time market data for each financial instrument offered for trading by the system. The market data consists of pricing information on each of the different treasury securities or securities that each of these interdealer brokers trade. The pricing information consists of four variables: (1) bid price; (2) bid size (the aggregate number of bidders and the amount that they want to buy at that price; (3) offering price; and (4) offering size (the aggregate total of security that would be offered at that particular size). In a preferred embodiment, the system permits a user to view current quotes (but not offering size) for securities that are not part of the offering inventory, i.e., available for trading by the system. The real time market data is provided by data feed 16 from one and preferably more than one interdealer broker such as Liberty Brokerage, Cantor Fitzgerald Securities, and Garban. As is known to those skilled in the art, such price feeds are provided in page-based format. In accordance with the present invention, the system proprietor 18 captures the real time market data in page-based format, consolidates the data (if more than one data feed is present) and converts this to a record-based format and processes it to determine a real time national best bid and offer price ("NBBO") for a given financial instrument. Advantageously, the system filters bad market data such as crossed (inverted) markets, incorrect handles and the like. In this way, the system provides safeguards against the execution of financially deleterious trades.

Figure 2:
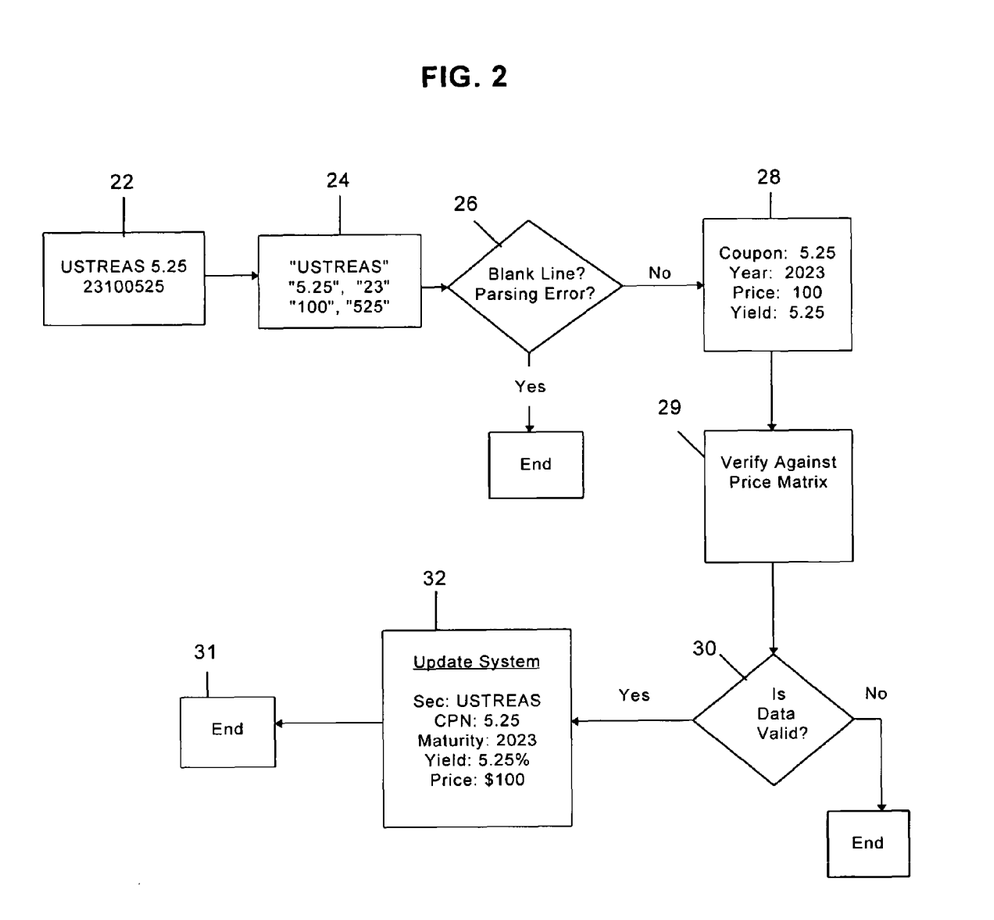
FIG. 2 is a process flow diagram illustrating the price feed conversion and validation process of the invention.

FIG. 2 illustrates the price feed conversion and validation process in accordance with the present invention for a US Treasury instrument having a coupon of 5.25, maturity in 2023, a price of $100 and a yield of 5.25%. As can be seen, market data is received in page-based format 22 which is parsed and reformatted to a record-based format 24. Assuming the conversion is successful 26 and no blank lines or parsing errors exist 28, the system continues to validate this information against a pricing matrix in order to determine the validity of the calculated yield. The pricing matrix is based upon market conditions, similar financial instruments and last trade executions and has predefined tolerances which may be readily adjustable by the system to reflect acceptable yield conditions. If a positive response is received (i.e., the data is valid) 30, the system proprietor updates the offering inventory database 14 with the converted record-based data 32.

Where there are no quote prices for a particular issue, the system derives a price based on the last transaction price or the last available quote for the issue. In calculating a derived price, the system first checks the market feed to ensure that there is no quote available for the issue. If a negative response is received, the system determines what the last transaction price (yield) or quote was, and calculates the spread at that point of time to a desired benchmark. The system then determines the current existing price (yield) of the desired benchmark and adds the captured spread to the existing price (yield) of the desired benchmark and the resulting price is the derived price. The system stores all of the spread and spread-related details in the system database 12. Preferably, a user can view this information in either graphical and/or tabular format as desired. As described in conjunction with the data conversion above, the system also has a tolerance for a predetermined price (yield) spread. Advantageously, if the derived price is outside of the tolerable spread, the system will not automatically execute an order for that particular financial instrument, but rather, will switch to manual mode, forwarding the proposed trade to a trader for execution. In addition, the system is able to look back one day when searching for the last transaction price or quote. Because of the high liquidity of U.S. Treasury, Liquid Agency and Zero Coupon STRIP financial instruments, the system generally does not have to look back more than one day to find a last price or quote. If no data is available within the current day, the system checks for the prior day "Fed Quote" (from the Federal Daily Reports). If a price is still not available, or a relationship at the time of the "Fed Quote" cannot be determined to carry forward, the issue is "flagged" or highlighted for review by a trader and a further determination of the liquidity (and hence, appropriateness) of the issue for trading in accordance with the invention is required.

Referring back to earlier discussion of the offering inventory database 14, this database provides the system database 12 with a real time display of the offering inventory. In accordance with the present invention, the system proprietor 14 automatically updates (i.e., adds or removes) securities which are offered in the offering inventory to reflect transactions that were automatically executed by the system as well as those which were manually entered by a user. Such automatic updating is subject to certain limitations including the availability of sufficient quantity of the financial instrument for trading; for example the minimum denomination of the security. In addition, the system proprietor 14 automatically updates the quantity of a financial instrument available for trading in the offering inventory to reflect prior automatic or manually entered trades. The system proprietor 14 also updates the price of each financial instrument in the offering inventory based on the NBBO or the derived price. In this instance, a trader's position is without consequence to automatic price updates. Preferably, a user can manually update the capability of the offering inventory, i.e., the type of security, the available quantity and the price. Additionally, the user can indicate that a financial instrument is an "axe," i.e., a high priority issue.

Figure 3:
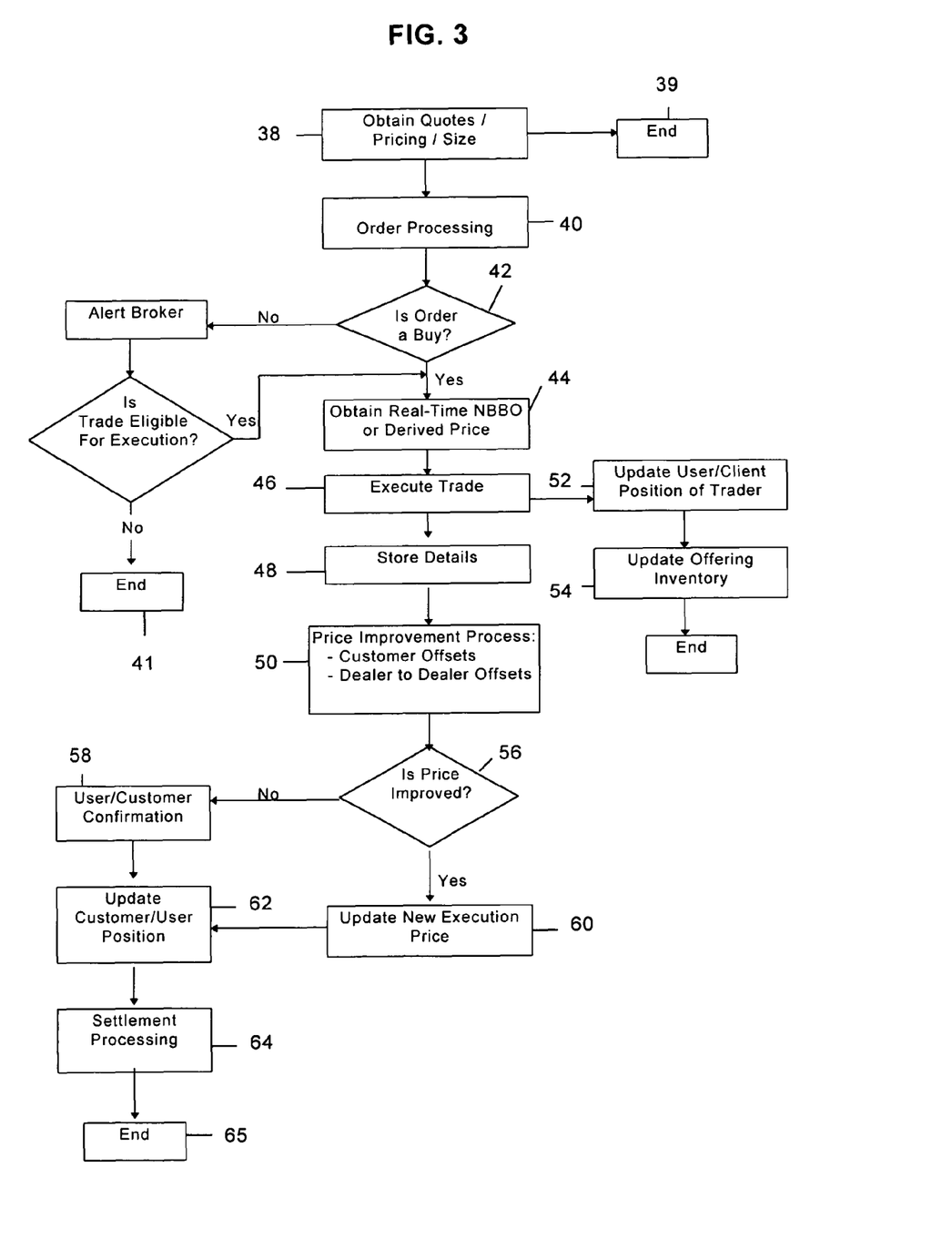
FIG. 3 is a process flow diagram illustrating system logic for processing a buy order in accordance with the present invention.

FIG. 3 illustrates system logic for processing a buy order in accordance with the present invention. A user connected to the system would obtain real time price and size quotes 38 for a particular financial instrument of interest based on the information provided to the system database 12 from the offering inventory 14. As previously indicated, the price is the NBBO, or where not available, a derived price for the particular financial instrument. At this point, the user can choose to exit to system 39 or continue with order processing 40. System dictates allow a user to enter and execute buy and sell market orders as well as enter buy and sell limit orders. The user can enter day limit orders in valid quote increments (fractions or decimals where appropriate) which are predetermined based on the issue. For automatic execution, the quantity of the order must be no less than the minimum denomination of the security and no greater than five million dollars. If the order is greater than five million dollars, the automatic processing is discontinued and the system forwards the order to a trader for manual processing. Advantageously, the system processes aggregate orders, that is, orders from multiple accounts executed simultaneously at the same price. In this instance, the system allows a breakdown of pieces for the aggregate orders and permits all orders to execute at the average price. As another advantageous feature, the system provides an alert to a user if an order has been entered which will create a short position for a customer or if the customer is not long a sufficient quantity to cover the sale. In this instance, the system will alert the user that a short position will be created, but will not abort automatic trade processing. The user will have the ability to cancel or continue order processing. Where the order is approved, automatic execution will commence as usual.

After order input is completed, and the order is ready for execution, the system will prompt the user for approval. The approval process includes a refresh to the price to reflect the current market conditions (e.g., a query whether the user wants to sell at a particular price). The system queries an internal clock and applies a time and date stamp to all orders (regardless of whom they are placed by) when received and when executed. Once an order (either market or limit) is approved and submitted, it is automatically forwarded to a trading system (not shown) for execution, and the user notified once it is filled. In this context, the trading system may occur in the public or private domain.

The system accommodates the cancellation of limit orders, provided that the order has not been executed. This cancellation function is generally not extended to market orders after entry, as these orders are automatically executed immediately after order entry. However, where a market order is (i) not fully entered into the system, (ii) rejected due to credit checks (i.e., buying power), or (iii) otherwise not automatically executed, it may be canceled. The system links a canceled and/or replaced order to the original order and forwards this to the user/customer as part of the confirmation process (discussed later).

Referring back to FIG. 3, a buy is automatically executed by the system based on an order entered by a user 42. In this instance, the system determines the NBBO or the derived price as described above 44, and executes the order in accordance therewith 46. Once executed, the system stores the details relating to the trade 48 (including the execution price at the actual time of execution and not at the time of order entry), subjects the order to a price improvement process 50 (discussed later), updates customer and/or user position (where the user is a trader) 52, and updates the offering inventory 54. Where an improved price is applied to the transaction 56, the user receives a confirmation message 58 identifying the new execution price 60, the user and/or customer position is concomitantly updated 62, and settlement instruction details (e.g., customer name, account number, or other customer identifier) 64 are ascribed to the order based on predefined criteria.

As previously discussed, the system accommodates manual entry of interfirm and dealer to dealer. Where a manual trade entry is effectuated, the system automatically updates the offering inventory and user position and effectuates settlement in accordance therewith. Advantageously, during execution of a manual trade the system has access to counterparty information for validation and retrieval of settlement instructions (e.g., counterparty name, account number or other identifier). Likewise, the system has access to security information (e.g., security short name or ticker symbol, cusip, or other security identifier) for validation and security retrieval. Validation and security retrieval is driven by querying a securities master database.

All orders entered are automatically processed for regular settlement, that is, 1-3 business days after execution. Nevertheless, the system can accommodate skip day, corporate or other settlement dates using manual intervention. Here, an order with a non-standard settlement date would be forwarded to a trader for review and manual execution. This allows a trader to apply price adjustments to account for financing considerations. All non-standard settlement trades, however, are not entitled to the price improvement process discussed below.

A particularly advantageous feature of the present invention is a real time price improvement process which accords customers with an improved price if an offsetting trade occurs within 30 seconds that results in a profit to a trader. That is, after a trade has been executed, the system tracks the same security in the traders position for thirty (30) seconds. If a trade is executed in the same security for two different customers within the same 30-second period and the trades could have crossed, the trades will be subject to a real time price improvement process which takes the average of the two prices and applies the new price to both orders. In this process, the second customer is not precluded from being the first customer for an ensuing 30 second comparison. Similarly, if a user enters a dealer to dealer or interfirm trade that offsets a customer trade, the customer trade will be subject to a real time price improvement process. Here, the system records the time of execution of the manually entered dealer to dealer or interfirm trade as well as the time of the manual trade entry.

The system then determines if the manually entered dealer to dealer or interfirm trade was an offset to any customer trade that occurred within the 30 seconds of the manual trade execution. If the manually entered trade is an offset, the customer trade, provided that it occurred within 30 seconds prior to the time of execution of the manual trade, is entitled to any favorable price difference.

If a trade is entitled to price improvement as a result of an automatically executed or manual trade, the trade is corrected to reflect the improved price. This occurs on a real time basis as soon as the price improvement is realized. Corrected trade details are updated and stored by the system with the new price, and a link provided to the original price for auditing purposes. As previously discussed with reference to FIG. 3, the system generates an electronic confirmation which is transmitted to the user after the price improvement process.

The system applies the price improvement process to all applicable trades. For example, if there is a same day trade correction to a buy/sell (including price or security type), the system will determine whether the updated version of the trade is entitled to price improvement and/or of it causes another trade to be entitled to price improvement. With price changes, the system determines the other side of the NBBO, or the derived price where the NBBO is unavailable at the time of trade execution, and reapplies the price improvement process. Likewise, for a security change, the system determines the NBBO, or the derived price where unavailable, and reapplies the price improvement process. In either instance, the system determines whether the updated version of the corrected trade entitles another trade to price improvement, but it will not remove any price improvement that might exist on another trade prior to the same trade correction. Since the system accommodates price and security changes as hereinabove described, the process for price improvement involving same day corrections occurs at the end of the day, before the confirmation process, so that only one confirmation is generated. Importantly, the system does not review price improvements for prior day transactions that would otherwise be impacted by trades or next day corrections. Accordingly, previous day corrections are not entitled to, nor do they entitle another trade to, price improvement.

By way of illustration, the price improvement process is set forth in the following examples.

1) A first customer buys 10 bonds at 99-16, 15 seconds later, a second customer sells 10 at 99-08. The price improvement process takes the average of the 2 prices, and applies this to the first customer buy and the second customer sell so that each customer receives a price improvement of $\frac{1}{16}$ of a point;
2) A first customer sells 10 bonds at 99-08. A second customer, 15 seconds later, buys 10 at 99-16. As above, the price improvement process takes the average of the 2 prices, and applies this to the first customer buy and the second customer sell so that each customer receives a price improvement of $\frac{1}{16}$ of a point;
3) A first customer buys 10 bonds at 99-08. A second customer, 15 seconds later, sells 10 bonds at 99-16. In this instance, each customer is better off with the original price so price improvement is not applied to either of the trades;
4) A first customer sells 10 bonds at 99-16. A second customer, 15 seconds later, buys 10 bonds at 99-08. In this instance, each customer is better off with the original price so price improvement is not applied to either of the trades;
5) A first customer buys 10 bonds at 99-16. A second customer, 15 seconds later, sells 25 bonds at 99-08.

Here, the system would take the average of the two prices, and apply the average price to the first customer's buy of 10 and the second customer's sell of 10. Accordingly, for 10 bonds, each customer receives an ⅛ point price improvement. The remaining 15 bonds sold by the second customer are only entitled to the original 99-08 price;

6) A customer buys 10 bonds at 99-16. A trader, 15 seconds later, buys 10 bonds at 99-08 from the street. In this instance, the system adjusts the customer buy trade to 10 at 99-08;

7) A customer sells 10 bonds at 99-08. A trader, 15 seconds later sells 10 bonds at 99-16 to the street. In this instance, the system will adjust the customer sell trade to 10 at 99-16;

8) A customer buys 10 bonds at 99-08. A trader, 15 seconds later, buys 10 bonds at 99-16 from the street. Here, the system does not apply a price improvement since the trader has lost money on the trade;

9) A customer sells 10 bonds at 99-16. A trader, 15 seconds later, sells 10 bonds at 99-08 to the street. Here, the system does not apply a price improvement since the trader has lost money on the trade; and 10) A customer sells 10 bonds at 99-08. A trader, 15 seconds later, sells 5 bonds at 99-16 to the street. In this instance, the system adjusts 5 bonds of the client sell trade to 99-16.

User type (i.e., financial advisor, trader, customer) will effect the ability to cancel and/or replace trades. In general, financial advisors will not have the ability to cancel executed trades, or modify any information pertinent to the net money from a particular trade; for example, settlement date, quantity, and price. By way of contrast, traders have the ability to cancel an executed trade, or modify any trade details which affect net money after appropriate counterparty and client and/or trade management approval. In addition, financial advisor users are unable to determine or access trader positions.

As previously discussed, the system generates an electronic confirmation which includes a confirmation number of executed orders immediately after the trade has gone through the price improvement process. This is in addition to conventional confirmation processes (i.e., mail, facsimile after trade settlement) that are established where a trade is executed on behalf of a customer. In addition, the system generates a confirmation (both electronic and where appropriate, by conventional means) when a trade has been canceled or corrected.

The system also contains real time risk management features. For example, the system can track securities bought and sold in different maturity sectors as determined by trader input. This would include the calculation of duration and 10 year equivalent for each maturity sector based on trader input security and value.

In accordance with the present invention, a user has the ability to query the system for all executed transactions, and more specifically, transaction details for all transactions executed with the preceding six months. A financial advisor user will be able to identify all transactions which make up a position. Traders are able to access a greater level of detail; for example, all details related to price improvement for a particular transaction. In addition, the system stores all transaction details for a period of seven years, and a user can review all pertinent transaction details for six months after execution.

Having thus described the invention in rather full detail, it will be understood that such detail need not be strictly adhered to but that various changes and modifications may suggest themselves to one skilled in the art, all falling within the scope of the present invention as defined by subjoined claims.

What is claimed is:

1. A server system for the automated trading of financial instruments, comprising:
    an updatable database that receives real time price and quantity information pertaining to each of a plurality of financial instruments from a market data feed, the plurality of financial instruments constituting an offering inventory; and
    a server that automatically:
    receives a first order to execute a first trade of a selected financial instrument;
    forwards the first order to a trading system to execute the first trade;
    identifies an offsetting trade relative to the first trade of the selected financial instrument, wherein the offsetting trade is identified within a predefined period of time after execution of the first trade;
    determines a price improvement value based on a first price for the first trade of the selected financial instrument and a second price for the offsetting trade of the selected financial instrument; and
    applies the price improvement value to at least the first price for the first trade of the selected financial instrument, resulting in an adjusted first price.

2. The system of claim 1, wherein the server cancels or revises orders or trades.

3. The system of claim 1, wherein the server notifies a user that an order has been executed.

4. The system of claim 1, wherein the server presents an interface for providing a user with the capability to manually update the offering inventory.

5. The system of claim 1, wherein the server automatically updates the offering inventory.

6. The system of claim 1, the market data feed being provided by at least one Interdealer Broker.

7. The system of claim 6, the market data feed being reformatted to record-based data prior to entry into the system.

8. The system of claim 1, further comprising a filter for removing incorrect market data from the offering inventory.

9. The system of claim 1, wherein the server calculates a derived price for the selected financial instrument, the derived price being calculated by:
    (a) determining a spread between a last transaction price and a desired transaction benchmark for the selected financial instrument;
    (b) determining a current existing price of the desired transaction benchmark; and
    (c) adding the spread to the current existing price of the transaction benchmark.

10. The system of claim 1, wherein the server generates a confirmation of the first trade after execution thereof.

11. The system of claim 1, wherein the server provides the user with the capability to manually enter interfirm or dealer to dealer trades for execution.

12. The system of claim 11, wherein the server automatically updates the offering inventory in accordance with the manual trade.

13. The system of claim 1, wherein the second price of the offsetting trade prior to application of the price improvement value is a national best bid and offer price.

14. The system of claim 13, wherein the server converts the national best bid and offer price to a derived price in the event the national best bid and offer price is not available.

15. A computer-implemented data processing method for the automated trading of financial instruments comprising;
- receiving, in an updatable database, real time price and quantity information pertaining to each of a plurality of financial instruments from a market data feed;
- receiving a first order to execute a first trade of a selected financial instrument;
- forwarding the first order to a trading system to execute the first trade;
- identifying an offsetting trade relative to the first trade of the selected financial instrument, wherein the offsetting trade is identified within a predefined period of time after execution of the first trade;
- determining a price improvement value based on a first price for the first trade of the selected financial instrument and a second price for the offsetting trade of the selected financial instrument; and
- applying the price improvement value to at least the first price for the first trade of the selected financial instrument, resulting in an adjusted first price.

16. The system of claim 1, wherein the server automatically applies the price improvement value to the second price for the offsetting trade of the selected financial instrument, resulting in an adjusted second price for the offsetting trade.

17. The method of claim 15, further comprising:
- automatically applying the price improvement value to the second price for the offsetting trade of the selected financial instrument, resulting in an adjusted second price for the offsetting trade.

18. The system of claim 1 wherein the price improvement value is determined based on an average of the first price for the first trade of the selected financial instrument and the second price for the offsetting trade of the selected financial instrument.

19. The method of claim 15 further comprising:
- determining price improvement value based on an average of the first price for the first trade of the selected financial instrument and the second price for the offsetting trade of the selected financial instrument.

20. The system of claim 1 wherein the price improvement value is determined to make the adjusted first price for the first trade of the selected financial instrument equal to the second price for the offsetting trade of the selected financial instrument.

21. The method of claim 15 further comprising:
- determining the price improvement value to make the adjusted first price for the first trade of the selected financial instrument equal to the second price for the offsetting trade of the selected financial instrument.

22. The system of claim 1, wherein the predefined period of time is within 30 seconds.

23. The method of claim 15, wherein the predefined period of time is within 30 seconds.

24. A server for the automated trading of financial instruments, comprising:
- a processor and memory programmed to automatically:
- transmit a first order to a trading system for execution of a first trade of a selected financial instrument;
- identify an offsetting trade relative to the first trade of the selected financial instrument, wherein the offsetting trade is identified within a predefined period of time after execution of the first trade;
- determine a price improvement value based on a first price for the first trade of the selected financial instrument and a second price for the offsetting trade of the selected financial instrument; and
- applies the price improvement value to at least one of the first price for the first trade and the second price for the offsetting trade.

* * * * *